(12) United States Patent
Uni

(10) Patent No.: US 12,492,710 B2
(45) Date of Patent: Dec. 9, 2025

(54) CENTRIFUGAL AIR BLOWER

(71) Applicant: SHINANO KENSHI KABUSHIKI KAISHA, Nagano (JP)

(72) Inventor: Masahiko Uni, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 0 days.

(21) Appl. No.: 19/058,517

(22) Filed: Feb. 20, 2025

(65) Prior Publication Data

US 2025/0320880 A1 Oct. 16, 2025

(30) Foreign Application Priority Data

Apr. 10, 2024 (JP) ................. 2024-063520

(51) Int. Cl.
| | |
|---|---|
| *F04D 29/44* | (2006.01) |
| *B60N 2/56* | (2006.01) |
| *F04D 17/16* | (2006.01) |
| *F04D 25/08* | (2006.01) |
| *F04D 29/42* | (2006.01) |

(52) U.S. Cl.
CPC .......... *F04D 29/441* (2013.01); *B60N 2/565* (2013.01); *F04D 17/16* (2013.01); *F04D 25/08* (2013.01); *F04D 29/4226* (2013.01)

(58) Field of Classification Search
CPC ...... F04D 17/16; F04D 25/08; F04D 29/4226; F04D 29/441; B60N 2/5642; B60N 2/565; B60N 2/5657
See application file for complete search history.

(56) References Cited

U.S. PATENT DOCUMENTS

| | | | | |
|---|---|---|---|---|
| 6,093,096 | A * | 7/2000 | Miyata ............... | B60H 1/00457 |
| | | | | 454/165 |
| 2017/0240078 | A1* | 8/2017 | Ishii ....................... | B60N 2/565 |
| 2021/0239127 | A1* | 8/2021 | Uni ......................... | F04D 17/10 |

FOREIGN PATENT DOCUMENTS

JP 2015-174580 5/2015

* cited by examiner

*Primary Examiner* — Nathaniel E Wiehe
*Assistant Examiner* — Jason G Davis
(74) *Attorney, Agent, or Firm* — Stephen J. Weyer, Esq.; Stites & Harbison, PLLC

(57) ABSTRACT

There is provided a centrifugal air blower capable of maintaining strength of a case body and having high handleability and reliability even when an exhaust port is provided to a radial-direction side surface of the case body, and securing air volume and static pressure and reducing noise even in a small and flat shape. In an annular air blowing path 4*f* formed to circle around a case body 4 at a radial-direction outer side by a first case 4*a* and a second case 4*b* being assembled together, a radial-direction side surface of the second case 4*b* is provided with an exhaust port 4*m* partitioned by a diffuser 4*n*. The diffuser 4*n* is formed upright at a bottom plate 4*q* forming a second air blowing path 4*e* and is coupled to an annular end part 4*r* arranged at a radial-direction outer side.

3 Claims, 7 Drawing Sheets

-■- WITHOUT TOP DIFFUSER / WITHOUT BOTTOM DIFFUSER
-■- WITHOUT TOP DIFFUSER / WITH BOTTOM DIFFUSER
-●- WITH TOP DIFFUSER / WITHOUT BOTTOM DIFFUSER
-■- WITH TOP DIFFUSER / WITH BOTTOM DIFFUSER

CENTRIFUGAL AIR BLOWER

CROSS-REFERENCE TO RELATED APPLICATION

This application is based upon and claims the benefit of priority of the prior Japanese Patent Application No. 2024-063520, filed on Apr. 10, 2024, and the entire contents of which are incorporated herein by reference.

TECHNICAL FIELD

The present disclosure relates to a centrifugal air blower used for, for example, a seat air-conditioning or an HVAC (Heating, Ventilation, and Air Conditioning) apparatus, etc.

BACKGROUND ART

For example, when a driver is in contact with a backrest or a seating part of a seat for a long period of time, such as during long-distance travel by driving a car, air that is high in temperature and humidity clings, and discomfort thus increases. Therefore, a seat air-conditioning apparatus to adjust high-temperature and high-humidity air that is likely to be accumulated mainly at the backrest portion and the seating portion is used.

As the seat air-conditioning apparatus, there are a type in which air is blown out from a seat, and a type in which air is drawn in and discharged from a seat. Here, a seat air-conditioning apparatus of the drawing-in type for which more comfortable air-conditioning effects can be expected is described. The seat air-conditioning apparatus of the drawing-in type sucks high-temperature and high-humidity air accumulated at the backrest portion and the seating portion to be removed from these areas, thereby obtaining an air-conditioning effect.

For example, a seat air-conditioning system that suppresses noise generated when air flows into an intake port of an air blower from a seat has been proposed. The intake port is formed at an upper-case part of a case that is assembled by the upper-case part and a lower-case part being threadedly fastened together at four corners. A motor including a stator and a rotor, and a centrifugal multi-blade fan are rotatably supported at the lower-case part. The rotor is assembled integrally with the centrifugal multi-blade fan. When the motor rotates and the centrifugal multi-blade fan rotates, air is drawn in from a seat side through the intake port of the upper-case part, and blown out from an outlet port that opens at four sides of the case (PTL 1: JP-A-2015-174580).

SUMMARY OF INVENTION

Technical Problem

In the configuration of PTL 1 described above, as the four sides of the case are opened, stiffness is extremely low. Accordingly, durability against a stress load applied to the seat, and handleability, such as assemblability, and reliability may decrease. Specifically, disconnection may occur when tension acts on cables such as a signal line and a feed line connected to a motor substrate, which reduces reliability. When ribs or the like are provided in order to increase stiffness of the case, costs increase and fixing of a lead wire requires ingenuity. Therefore, handling becomes complicated.

Furthermore, when an exhaust port cannot be secured at an installation surface of a centrifugal air blower, which is an axial-direction bottom surface of the case, the exhaust port is required to be provided to a radial-direction side surface as in PTL 1. In this case, for example, when the centrifugal air blower is used for an on-vehicle purpose, it is also required for the centrifugal air blower to maintain strength of a case body with a small and flat shape, secure air volume and static pressure, and achieve noise reduction.

Solution to Problem

The present disclosure has been accomplished to solve these problems, and an object thereof is to provide a centrifugal air blower capable of maintaining strength of a case body and having high handleability and reliability even when an exhaust port is provided to a radial-direction side surface of the case body, and securing air volume and static pressure and reducing noise even in a small and flat shape.

In order to achieve the above-described object, the present disclosure includes the following configurations.

A centrifugal air blower includes a case body that accommodates therein a centrifugal fan and a motor adapted to rotary drive the centrifugal fan. The centrifugal air blower draws in air from an axial-direction center part of the case body and discharges air from a radial-direction side surface of the case body. The case body includes a first case and a second case. The first case is assembled to cover the centrifugal fan and provided with an intake opening part at an axial-direction center part and an annular first air blowing path formed at a radial-direction outer side. The second case includes, at an outer circumferential side of a bottom plate that axially supports the motor to be rotatable, an annular second air blowing path formed on a radial-direction outer side of an outer-circumferential end part of the centrifugal fan. The second air blowing path is assembled with the first air blowing path. A dome-shaped space part formed on an opposite surface side to the intake opening part by a hub and a main plate continuing thereto of the centrifugal fan accommodates the motor in such a manner as to overlap in an axial direction. An exhaust port is provided to a radial-direction side surface of the second case while being partitioned by a diffuser. The diffuser is formed upright at the bottom plate forming the second air blowing path and is coupled to an annular end part arranged at the radial-direction outer side.

According to the configuration, the diffuser is formed upright at the bottom plate forming the second air blowing path of the second case and is coupled to the annular end part arranged at the radial-direction outer side, and the exhaust port is provided to the radial-direction side surface of the second case while being partitioned by the diffuser. Therefore, even when the exhaust port is provided to the radial-direction side surface of the second case, the second case has improved strength, and has high stiffness as the case body and improved handleability and reliability. Moreover, even with a short exhaust channel from the centrifugal fan to the exhaust port, air volume can be secured and static pressure can be increased.

In addition, the dome-shaped space part formed on the opposite surface side to the intake opening part by the hub and the main plate continuing thereto of the centrifugal fan accommodates the motor in such a manner as to overlap in the axial direction. Therefore, even the centrifugal air blower in the same physical size can be made smaller and flatter with a reduced axial dimension of the centrifugal air blower. Moreover, an increase in an outer diameter of the centrifugal fan and an increase in areas of the intake opening part and the exhaust port can make the centrifugal air blower smaller and flatter in the axial direction, and a flow rate can be increased with a low rotation speed. Furthermore, since the annular air blowing path formed to circle around the case body at the radial-direction outer side does not include a partition wall called tongue part, peak sound is not generated and noise reduction is achievable.

The diffuser preferably includes a plurality of diffuser panels formed upright at the bottom plate at a given interval. In plan view of an inner surface of the second case, the diffuser panels are preferably coupled to the annular end part in such a manner as to be formed upright in an arc-like shape from a radial-direction inner side to outer side of the bottom plate while having gradually increasing height. The bottom plate forms the second air blowing path.

Accordingly, when the inner surface of the second case is seen in plan view, the plurality of diffuser panels formed upright at the disk-shaped bottom plate are coupled to the annular end part in such a manner as to stand in an arc-like shape from an outer circumferential edge at an inner-diameter side to the radial-direction outer side of the bottom plate while having gradually increasing height. The bottom plate forms the second air blowing path. Therefore, the second case has improved strength, and noise can be reduced by distribution of positions where peak sound at a frequency component obtained thorough multiplication of the number of blades of an impeller by a rotation frequency is generated.

At an inner wall surface between a radial-direction inner wall and a radial-direction outer wall forming the first air blowing path and formed upright in a concentric manner, in plan view of the first case, ridges may be formed at a given interval in such a manner as to continue in an arc-like shape from the radial-direction inner wall toward the radial-direction outer wall while having gradually increasing height.

Accordingly, air drawn in from the intake opening part of the first case by rotation of the centrifugal fan can be guided to the second air blowing path while being diffused by the ridges at the first air blowing path. Particularly, as compared to a case where only a second diffuser is provided to the second case, static pressure in a low flow-rate range can be increased.

A ridge included in a first diffuser provided to the first air blowing path of the first case and a diffuser panel included in a second diffuser provided to the second air blowing path of the second case are each preferably formed in an arc-like shape to follow a rotation direction of the centrifugal fan.

Accordingly, as the centrifugal fan rotates, compressed air guided from the first air blowing path to the second air blowing path along the ridge can efficiently be discharged from the exhaust port partitioned by the diffuser panel.

Advantageous Effects of Invention

According to the centrifugal air blower described above, a centrifugal air blower can be provided, which is capable of maintaining strength of a case body and having high handleability and reliability even when an exhaust port is provided to a radial-direction side surface of the case body, and securing air volume and static pressure and reducing noise even in a small and flat shape.

DESCRIPTION OF EMBODIMENTS

Hereinafter, referring to the accompanying drawings, an embodiment of a centrifugal air blower according to the present disclosure is described. First, a schematic configuration of the centrifugal air blower is described with reference to FIGS. 1 to 14. As a motor M, a brushless DC motor is used, and in this embodiment, an external rotor motor is used. Note that an internal rotor motor may be used.

Figure 1:
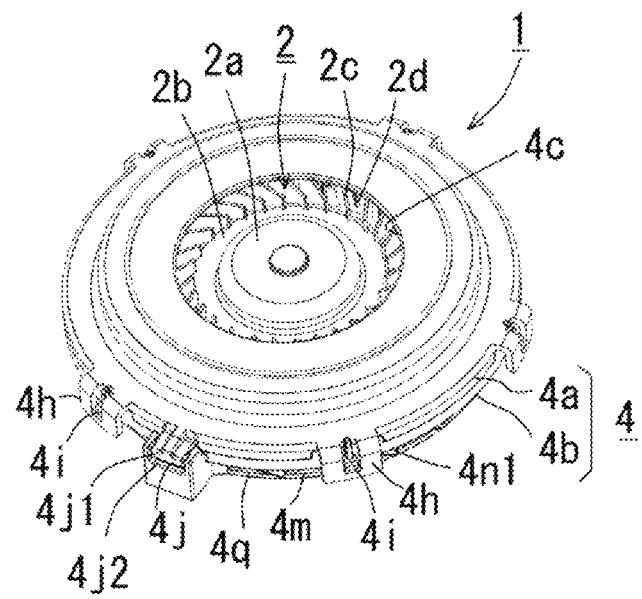
FIG. 1 is a perspective view of a centrifugal air blower.
Figure 3:
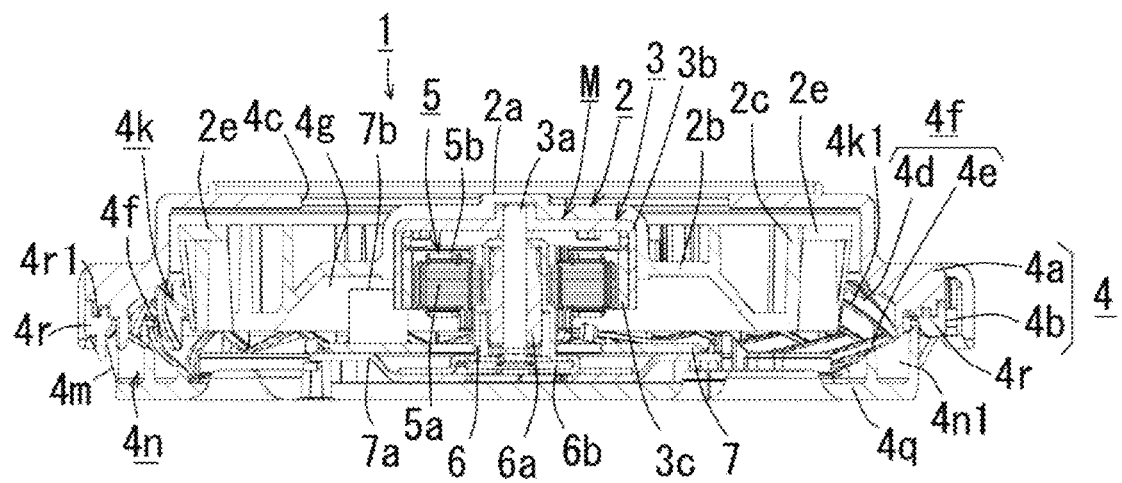
FIG. 3 is a sectional view of a centrifugal air blower.

As illustrated in FIG. 3, in a centrifugal air blower 1, a centrifugal fan 2 and a rotor 3 are assembled integrally, and the motor M that rotary drives these components is accommodated in a case body 4. Air is drawn in from an axial-direction center part of the case body 4, and compressed air is discharged from a radial-direction side surface. As illustrated in FIG. 1, the case body 4 is formed by assembling of a first case 4a that is assembled to cover the centrifugal fan 2, and a second case 4b that axially supports the motor M (the rotor 3 and a stator 5; see FIG. 3) to be rotatable.

In FIG. 3, an intake opening part 4c is provided to a center part of the first case 4a, and an annular first air blowing path 4d is formed at a radial-direction outer side of the first case 4a. An annular second air blowing path 4e to be assembled with the first air blowing path 4d is formed at a radial-direction outer side of the second case 4b. The first case 4a and the second case 4b are assembled together to form an annular air blowing path 4f at a radial-direction outer side of the case body 4. A bearing holding part 6 and a motor substrate 7 are assembled to a center part of the second case 4b. A lead wire of a stator coil 5b is connected to the motor substrate 7, and a hall sensor that detects a position of a rotor magnet 3c, etc., are mounted on the motor substrate 7. In a case in which the motor M is of a sensorless type, a position detection sensor can be omitted. A stator core 5a is integrally fixed to an outer-circumferential side of the bearing holding part 6, and a rotor shaft 3a is axially supported, via a bearing 6a, by a shaft hole of the bearing holding part 6 to be rotatable. The stator coil 5b is wound around a pole tooth formed at the stator core 5a, and a tip-end part of the pole tooth is disposed to face the rotor magnet 3c. One end part of the rotor shaft 3a is integrally assembled, by press fit, shrink fit, adhesion, or combination thereof, to a hub of a rotor yoke 3b formed in a cup shape. The other end part of the rotor shaft 3a is supported by a shaft support part 6b provided inside the bearing holding part 6. The shaft support part 6b is supported by a substrate support part 7a that supports the motor substrate 7. The rotor magnet 3c is integrally assembled to an inner circumferential surface of the rotor yoke 3b. Note that a center of the intake opening part 4c is not required to strictly coincide with an axial line of the rotor shaft 3a of the motor M as long as a position of the intake opening part 4c is near the axial-direction center part of the case body 4, and the centrifugal fan 2 operates without lowering efficiency.

Figure 4:
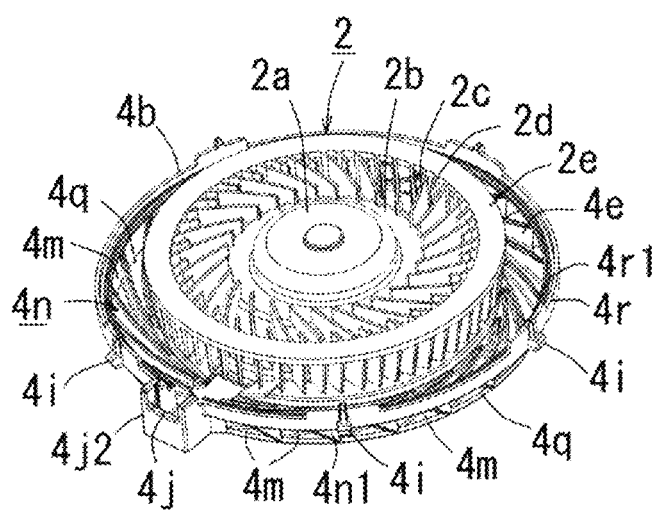
FIG. 4 is a perspective view of the centrifugal air blower in FIG. 1, where a first case is removed.

As illustrated in FIG. 4, in the centrifugal fan 2, a main plate 2b continuing from a hub 2a to the radial-direction outer side is formed in a dome shape. The main plate 2b continuing to the hub 2a is provided to extend to the radial-direction outer side while inclining to a downstream side in an air-blowing direction. A plurality of impellers 2c curving from the radial-direction inner side to outer side is formed upright on the main plate 2b. Around the radial-direction outer side (at an outer-circumferential edge part) of the impellers 2c formed upright on the main plate 2b continuing to the hub 2a, an auxiliary impeller 2d is formed upright between the corresponding adjacent impellers 2c at an equal interval (at a center between the impellers 2c). Therefore, pressure pulsation per blade can be reduced to suppress generation of peak sound due to interference with a diffuser. Air drawn in from the intake opening part 4c opposed to the hub 2a of the centrifugal fan 2 is compressed and sent out, by the impellers 2c and the auxiliary impellers 2d formed on the main plate 2b, to the annular air blowing path 4f provided at the radial-direction outer side. An annular shroud 2e is coupled to edge parts of the impellers 2c and the auxiliary impellers 2d at the outer circumferential side, and air compressed by the impellers 2c and the auxiliary impellers 2d is rectified and sent out toward the annular air blowing path 4f (see FIG. 3) at the outer circumferential side.

Moreover, as illustrated in FIG. 3, the hub 2a and the main plate 2b continuing thereto of the centrifugal fan 2 form a dome-shaped space part 4g on the opposite surface side to the intake opening part 4c. This dome-shaped space part 4g can be utilized to accommodate the motor M and a tall component (an electrolytic capacitor 7b etc.) mounted on the motor substrate 7, and the centrifugal fan 2 and the motor M can be assembled together in a compact manner. Moreover, the dome-shaped space part 4g accommodates the rotor 3 and the stator 5 of the motor M in such a manner as to overlap in the axial direction. Therefore, even the centrifugal air blower 1 in the same physical size can be made smaller and flatter with a reduced axial dimension of the centrifugal air blower 1.

As illustrated in FIG. 1, the first case 4a and the second case 4b are overlapped one another in such a manner that their opening parts face one another, and a lock piece 4h provided to an outer circumference of a side part of the first case 4a is locked with respect to a lock part 4i provided to an outer circumference of a side part of the second case 4b. In this manner, the first case 4a and the second case 4b are integrally assembled together. Moreover, the first case 4a and the second case 4b include a wiring connection port 4j formed to lead wiring connected to the motor substrate 7 outside of the case (see FIG. 2). The wiring connection port 4j is formed by a fit plate 4j1 projectingly provided to a side surface of the first case 4a being fitted to a fit groove 4j2 projectingly provided to a corresponding side surface of the second case 4b (see FIGS. 1 and 2).

Figure 10:
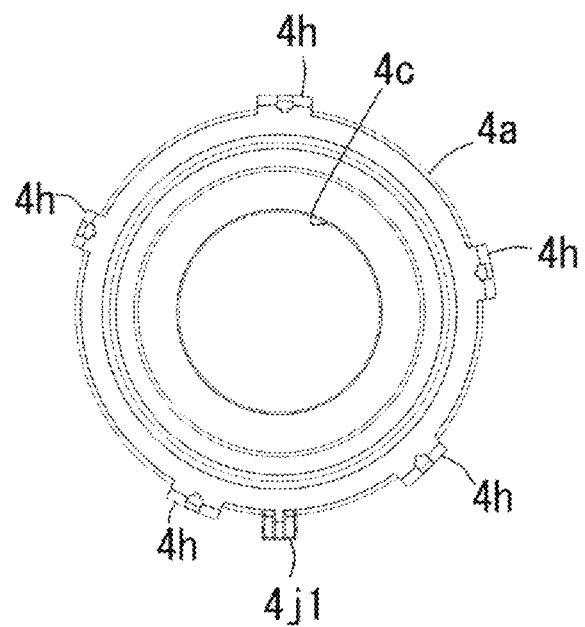
FIG. 10 is a plan view of a first case.
Figure 11:
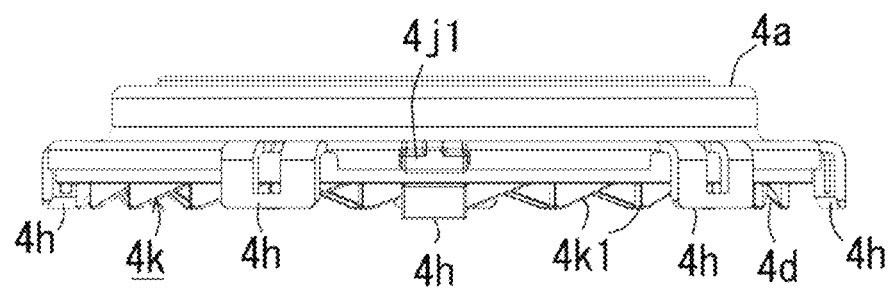
FIG. 11 is a front view of a first case.
Figure 12:
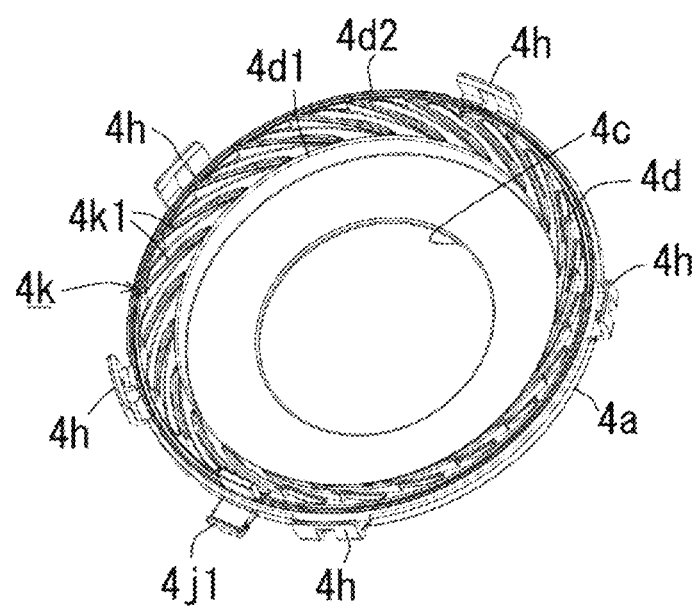
FIG. 12 is a perspective view of an inner-surface side of a first case.
Figure 13:
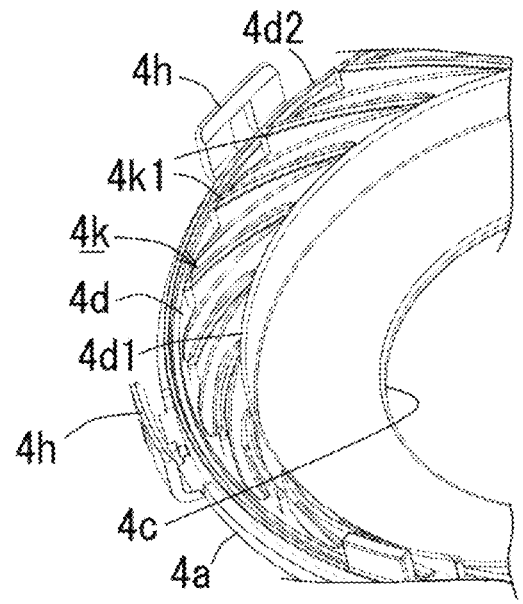
FIG. 13 is an enlarged perspective view of a part of the first case in FIG. 12.

As illustrated in FIG. 10, the first case 4a includes the first air blowing path 4d formed at the side surface part at the outer-circumferential side continuing to an upper surface part where the intake opening part 4c of the first case 4a is provided (see FIG. 11). As illustrated in FIGS. 12 and 13, at an inner surface on the radial-direction outer side of the intake opening part 4c, a radial-direction inner wall 4d1 and a radial-direction outer wall 4d2 forming the first air blowing path 4d are formed upright in a concentric manner. The first air blowing path 4d may include a first diffuser 4k formed therein.

Specifically, as illustrated in FIG. 12, at an inclined wall surface between the radial-direction inner wall 4d1 and the radial-direction outer wall 4d2, when the first case 4a is seen in plan view, ridges 4k1 are formed at a given interval in such a manner as to continue in an arc-like shape from the radial-direction inner wall 4d1 toward the radial-direction outer wall 4d2 while having gradually increasing height. Each ridge 4k1 is formed in such a manner that an outer-side end part in the radial direction is higher than the radial-direction outer wall 4d2 (see FIG. 13). Note that the first diffuser 4k is not necessarily provided to the first air blowing path 4d but may be omitted.

Figure 2:
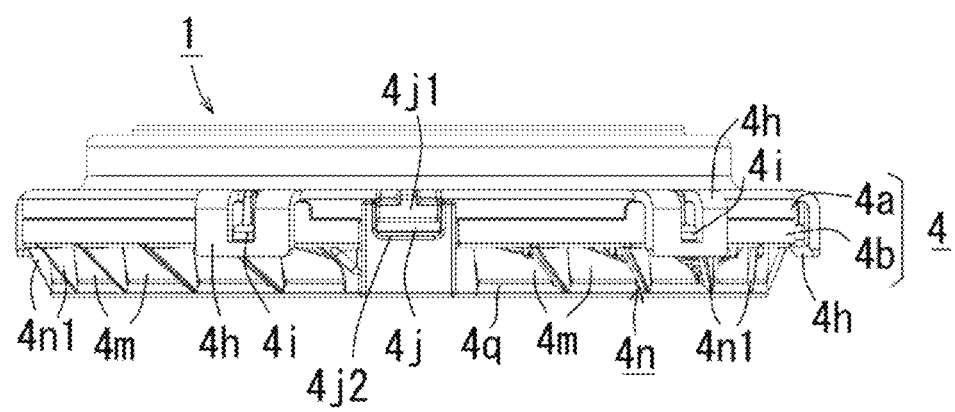
FIG. 2 is a front view of a centrifugal air blower.
Figure 8:
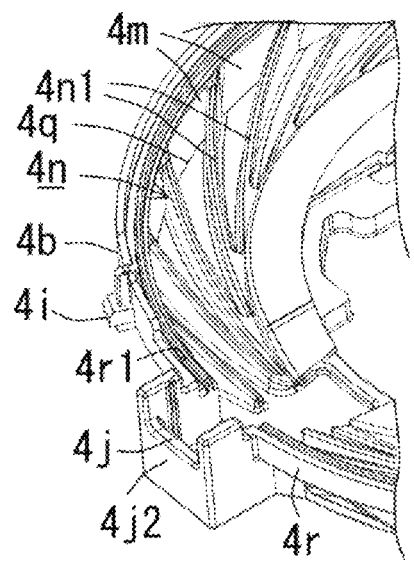
FIG. 8 is an enlarged perspective view of a part of the second case in FIG. 6.
Figure 9:
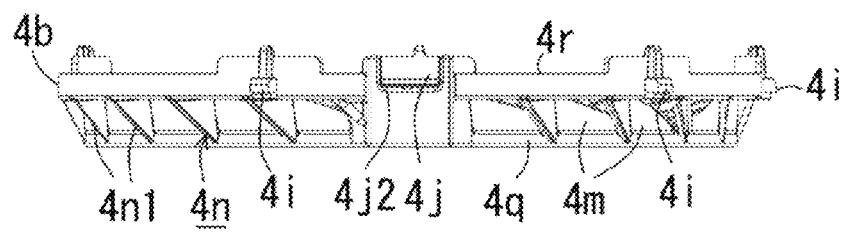
FIG. 9 is a front view of a second case.

As illustrated in FIG. 2, the second case 4b includes, at the radial-direction side surface, an exhaust port 4m partitioned by a second diffuser 4n (see FIG. 9). The second diffuser 4n is formed upright at a bottom plate 4q forming the second air blowing path 4e, and is coupled to an annular end part 4r arranged at the radial-direction outer side. The annular end part 4r includes, at an upper-end part thereof, an uneven part 4r1 formed to mesh with the first case 4a, and is an opening end part of the second case 4b (see FIGS. 3 and 8).

Figure 6:
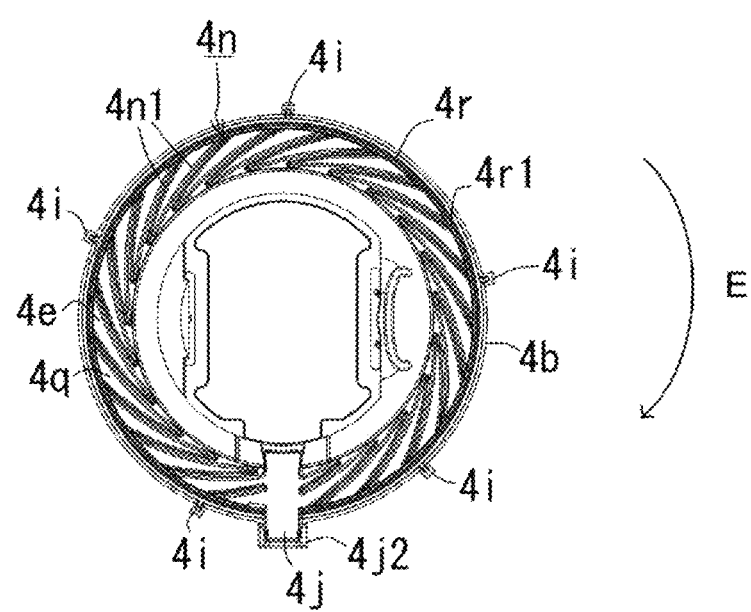
FIG. 6 is a plan view of an inner-surface side of a second case.
Figure 7:
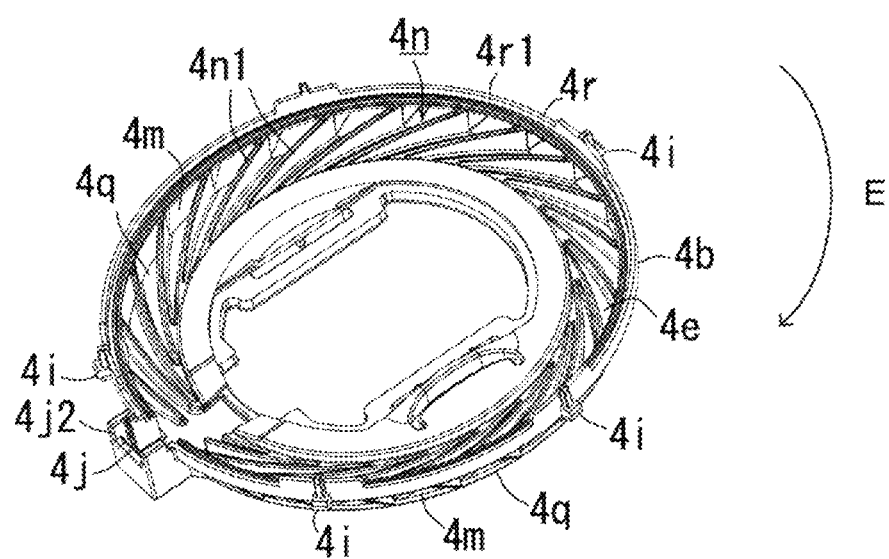
FIG. 7 is a perspective view of a second case.

As illustrated in FIGS. 6 and 7, the second diffuser 4n includes a plurality of diffuser panels 4n1 formed upright at the bottom plate 4q of the second case 4b at a given interval. When the inner surface of the second case 4b is seen in plan view, the diffuser panels 4n1 are coupled to the annular end part 4r at a given interval in such a manner as to stand in an arc-like shape from the radial-direction inner side of the bottom plate 4q forming the second air blowing path 4e toward the annular end part 4r at the radial-direction outer side while having gradually increasing height.

Accordingly, when the inner surface of the second case 4b is seen in plan view, the plurality of diffuser panels 4n1 formed upright at the disk-shaped bottom plate 4q are coupled to the annular end part 4r in such a manner as to stand in an arc-like shape from the radial-direction inner side to outer side of the bottom plate 4q while having gradually increasing height. The bottom plate 4q forms the second air blowing path 4e. Therefore, the second case 4b has improved strength, and noise can be reduced by distribution of positions where peak sound at a frequency component obtained thorough multiplication of the number of blades of the impeller 2c by a rotation frequency is generated.

Specifically, as illustrated in FIGS. 6 and 7, the plurality of diffuser panels 4n1 included in the second diffuser 4n has a curved-surface shape having a curved surface whose downstream-end side in the exhaust direction is shifted by a given amount in a rotation direction E of the centrifugal fan 2 in order for exhaust following rotation of the centrifugal fan 2 in an arrow direction. As illustrated in FIG. 8, the exhaust port 4m is formed between the diffuser panels 4n1 adjacent to one another.

Moreover, as long as the ridges 4k1 included in the first diffuser 4k provided to the first air blowing path 4d of the first case 4a and the diffuser panels 4n1 included in the second diffuser 4n provided to the second air blowing path 4e of the second case 4b are formed in an arc-like shape to follow the rotation direction of the centrifugal fan 2, the ridges 4k1 and the diffuser panels 4n1 may be formed at positions opposed to one another, or may be arranged alternately at positions to be meshed with one another when the first case 4a and the second case 4b are assembled together.

Accordingly, as the centrifugal fan 2 rotates, compressed air guided from the first air blowing path 4d to the second air blowing path 4e along the ridges 4k1 can efficiently be discharged from the exhaust ports 4m partitioned by the diffuser panels 4n1.

Figure 5:
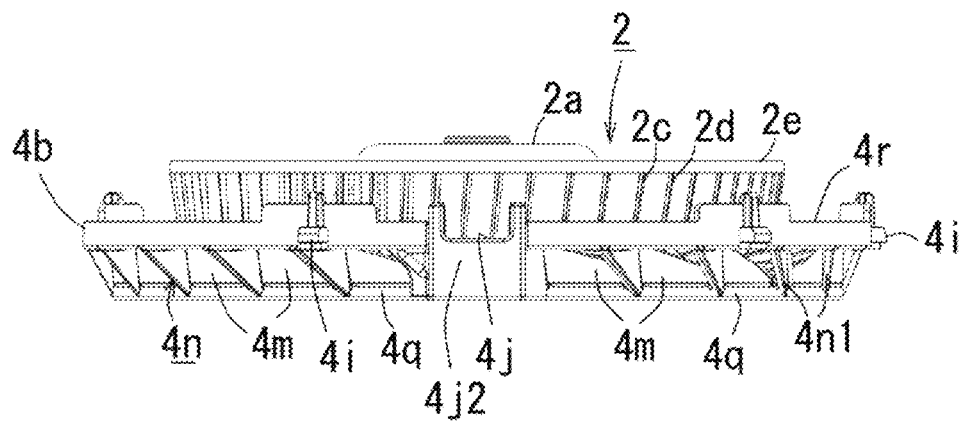
FIG. 5 is a front view of FIG. 4.

As illustrated in FIGS. 4 and 5, the second air blowing path 4e is closed by the bottom plate 4q, and air is discharged from the exhaust ports 4m. The exhaust ports 4m are partitioned by the plurality of diffuser panels 4n1 formed upright at the bottom plate 4q and are provided at the radial-direction outer side of the second case 4b. Therefore, even when the centrifugal air blower 1 is small and flat, a necessary air volume can be secured, and as compared to a case without the second diffuser 4n, static pressure can be increased even with a short exhaust channel from the centrifugal fan 2 to the exhaust port 4m.

Figure 14:
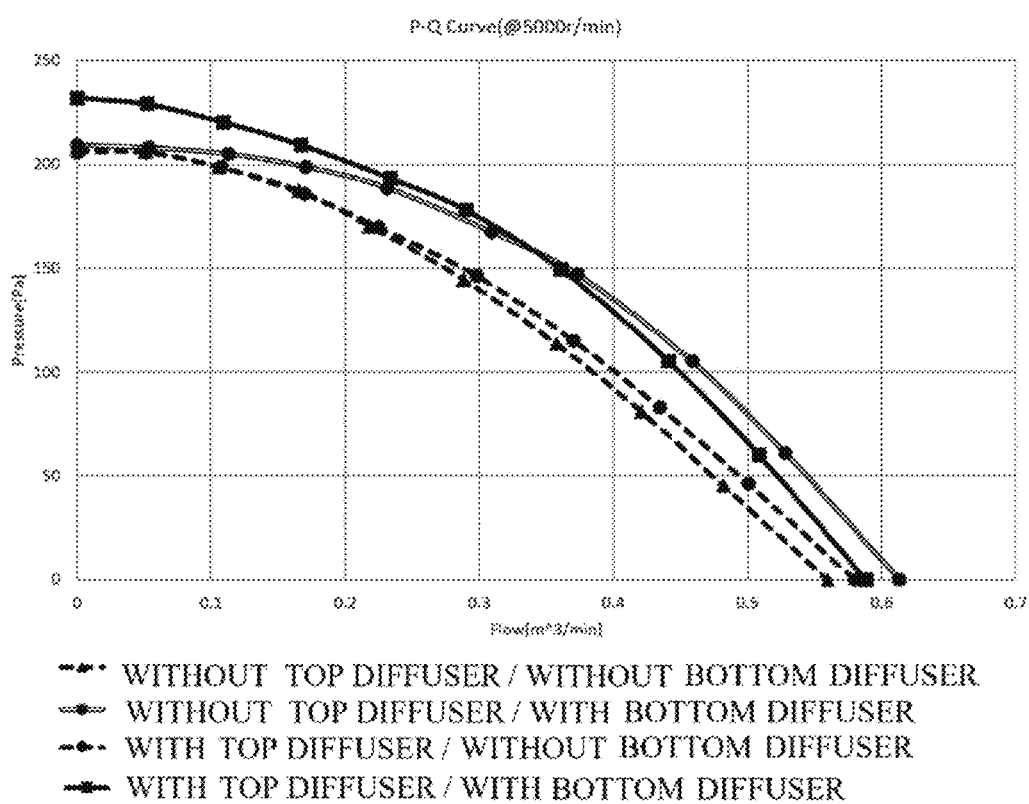
FIG. 14 is a graph showing air volume-static pressure characteristics depending on existence of diffusers in a first case and a second case of a centrifugal air blower.

Here, FIG. 14 illustrates a graph showing air volume-static pressure characteristics (P-Q characteristics) in accordance with combination patterns of existence of the first diffuser 4k in the first case 4a and existence of the second diffuser 4n in the second case 4b.

Broken lines in the graph in FIG. 14 include a broken line with "▲" markers, showing air volume-static pressure characteristics (P-Q characteristics) in a case in which the first diffuser 4k and the second diffuser 4n do not exist, and the other broken line with "●" markers, showing air volume-static pressure characteristics (P-Q characteristics) in a case in which only the first diffuser 4k is provided to the first case 4a.

As shown in the graph by the broken line with "●" markers, it can be seen that, as 5 compared to the case without the first diffuser 4k, the case with the first diffuser 4k has improved air volume-static pressure characteristics (P-Q characteristics).

Solid lines in the graph in FIG. 14 include a solid line with "●" markers, showing air volume-static pressure characteristics (P-Q characteristics) in a case in which only the second diffuser 4n is provided to the second case 4b, and the other solid line with "■" markers, showing air volume-static pressure characteristics (P-Q characteristics) in a case in which the first diffuser 4k is provided to the first case 4a and the second diffuser 4n is provided to the second case 4b.

First, in the graph, it can be seen that the solid lines (the white line with "●" markers and the black line with "■" markers) have improved air volume-static pressure characteristics (P-Q characteristics) as compared to the broken lines (the broken line with "▲" markers and the broken line with "●" markers). That is, as compared to the case in which only the first diffuser 4k is provided to the first case 4a, the case in which the second diffuser 4n is provided to the second case 4b has improved air volume-static pressure characteristics (P-Q characteristics) as a whole.

Moreover, in comparison between the solid lines (the white line with "●" markers and the black line with "■" markers) in the graph, it can be seen that the case in which the first diffuser 4k is provided to the first case 4a and the second diffuser 4n is provided to the second case 4b has improved air volume-static pressure characteristics (P-Q characteristics) in a low flow-rate range.

As described above, by the second diffuser 4n being formed upright at the bottom plate 4q forming the second air blowing path 4e and being coupled to the annular end part 4r arranged at the radial-direction outer side, the exhaust port 4m is provided to the radial-direction side surface of the second case 4b while being partitioned by the second diffuser 4n. Therefore, even when the exhaust port 4m is provided to the radial-direction side surface of the second case 4b, the second case 4b has improved strength, and has high stiffness as the case body 4 and improved handleability and reliability. Moreover, even with a short exhaust channel from the centrifugal fan 2 to the exhaust port 4m, air volume can be secured and static pressure can be increased.

Moreover, the dome-shaped space part 4g formed on the opposite surface side to the intake opening part 4c by the hub 2a and the main plate 2b continuing thereto of the centrifugal fan 2 accommodates the motor M in such a manner as to overlap in the axial direction. Therefore, even the centrifugal air blower in the same physical size can be made smaller and flatter with a reduced axial dimension of the centrifugal air blower 1. Moreover, an increase in an outer diameter of the centrifugal fan 2 and an increase in areas of the intake opening part 4c and the exhaust port 4m can make the centrifugal air blower 1 smaller and flatter in the axial direction, and a flow rate can be increased with a low rotation speed. Furthermore, since the annular air blowing path 4f formed to circle around the case body 4 at the radial-direction outer side does not include a partition wall called tongue part, peak sound is not generated and noise reduction is achievable.

Here, effects of the centrifugal air blower 1 according to the disclosure in vehicle air conditioning are described in detail.

In a case in which the centrifugal air blower 1 is attached to a seat of a vehicle for a purpose of drawing-in type seat air conditioning, noise generated in the step of "the centrifugal fan 2 rotating to intake air in the axial direction, generate an air current in an outer circumferential direction inside the case body 4, change the direction around the outer circumference inside the case body 4, and discharge air outside in the radial direction at the outer circumferential part", which is the operation of the centrifugal air blower 1, has a higher rate relative to noise of the seat air conditioning as a whole. A channel from a drawing-in port at a seat surface to the centrifugal air blower 1 is short, and the exhaust port of the centrifugal air blower 1 can secure an ample channel cross-sectional area for an exhaust flow rate, resulting in limitative noise generation factors other than the air blower. Therefore, noise attributed to a component other than the air blower and noise attributed to the centrifugal air blower 1 can clearly be separated. Characteristics of the centrifugal air blower 1, such as noise generation factors and output, are contained inside the case body 4. Accordingly, since the characteristics (output and noise) as the air blower become constant and the case body 4 has high stiffness as described above, a seat to which the centrifugal air blower 1 is attached has an increased degree of freedom of a position and a shape of an attachment position, and the centrifugal air blower 1 becomes applicable to various types of seats, which allows cost reduction to be realized by a mass production effect.

Moreover, making the characteristics (output and noise) constant increases simulation precision of seat air-conditioning characteristics with regard to riding comfort for a rider from a vehicle designing phase, thus also achieving a secondary effect of reducing a design man-hour of a vehicle manufacturer.

Furthermore, as compared to the drawing-in type seat air conditioning disclosed in the above-mentioned related art (PTL 1: JP-A-2015-174580), the centrifugal air blower 1 achieves an effect of being capable of reducing seat size.

Unlikely to the disclosure, the air blower disclosed in PTL 1 performs exhaust in a radial direction (to an outer circumferential side) of a rotational axis. Therefore, as described above, there is a concern for durability against mechanical stress of the air blower and mechanistically strong design is required, which increases a dimension and weight. In addition, in order to process exhaust at a seat rear-end part (a rear-end part in a case of a back surface, and a lower-end part in a case of a seat surface), connection parts to a duct inside the seat, a seat back surface rear-side discharging port, and the like, are required to be provided to the air blower, which further increases a dimension and weight. With regard to this, the centrifugal air blower 1 of the disclosure includes the case body 4 with high stiffness and does not include accessories, and thus can be smaller than the centrifugal air blower of PTL 1.

Conventionally, a vehicle seat does not include a component member such as an air blower for the purpose of air conditioning, and a seat to which an air blower is attached substantially includes a foreign object inside a seat cushion. In order for a seated rider not to feel the air blower as a foreign object, the air blower will be reduced in size or the seat cushion will have an increased thickness. In view of a trend of weight and size reduction of vehicles in recent years, it is apparent that the centrifugal air blower 1 of the disclosure provides an effect in accordance with the trend.

Furthermore, the foregoing embodiment is described while taking an on-vehicle 5 seat air conditioning as an example, the embodiment is not limited to this, but it may be used for a centrifugal air blower for HVAC (Heating, Ventilation, and Air Conditioning), and the like. For example, the centrifugal air blower 1 of the disclosure can be used for a vehicle HVAC other than seat air conditioning. Conventionally, an air conditioning air blower (an air blower with a scroll-casing having a tongue part) is arranged in surplus space in an automobile. However, the surplus space is reduced due to size reduction and enlargement of cabin space of automobiles in recent years, and a vehicle body structure of electric automobiles differs from that of conventional automobiles. Therefore, considering space for arranging the air conditioning air blower is becoming an issue bothering automobile designers. When an air blower having characteristics, such as of a thin type, high pressure, and different directions of intake and exhaust like the centrifugal air blower 1 of the disclosure is employed, automobile design can have an improved degree of freedom. In the conventional automobile, HVAC-related devices are concentratedly arranged at a front seat in the vicinity in front of knees due to an installation position of an air blower. However, as for the centrifugal air blower 1 of the disclosure, a plurality of the centrifugal air blowers can be arranged at a ceiling, a side wall, a door, and the like in a distributed manner. Distributed air conditioning with saved space can be realized by combination with a thermoelectric device such as a Peltier device, which may be helpful to automobile design with high space utilization efficiency. Needless to say, the disclosure has similar effects even in places other than vehicles, where surplus space is small and where space for arranging the conventional air conditioning air blower is unlikely to be secured.

What is claimed is:

1. A centrifugal air blower comprising a case body that accommodates therein a centrifugal fan and a motor adapted to rotary drive the centrifugal fan, and configured to draw in air in an axial direction from of the case body and discharge air from a radial-direction side surface of the case body, wherein
the case body comprises:
a first case configured to be assembled to cover the centrifugal fan and provided with an intake opening part at a radial-direction center part and an annular first air blowing path formed at a radial-direction outer side; and
a second case comprising, at an outer circumferential side of a bottom plate configured to axially support the motor to be rotatable, an annular second air blowing path formed on a radial-direction outer side of an outer-circumferential end part of the centrifugal fan, the second air blowing path being configured to be assembled with the first air blowing path,
a dome-shaped space part formed on an opposite surface side to the intake opening part by a hub and a main plate continuing thereto of the centrifugal fan accommodates the motor in such a manner as to overlap in the axial direction, and
an exhaust port is provided to a radial-direction side surface of the second case while being partitioned by a diffuser, the diffuser being coupled to the bottom plate an annular opening end part, the diffuser includes a plurality of diffuser panels formed upright at the bottom plate at a given interval, and in plan view of an inner surface of the second case, the diffuser panels are each coupled to the opening end part in such a manner as to be formed upright in an arc-like shape from a radial-direction inner side to a radial-direction outer side of the bottom plate while having gradually increasing height, the bottom plate forming the second air blowing path.

2. The centrifugal air blower according to claim 1, wherein, at an inner wall surface between a radial-direction inner wall and a radial-direction outer wall forming the first air blowing path and formed upright in a concentric manner, in plan view of the first case, ridges are formed at a given interval in such a manner as to continue in an arc-like shape from the radial-direction inner wall toward the radial-direction outer wall while having gradually increasing height.

3. The centrifugal air blower according to claim 2, wherein, a ridge included in a first diffuser provided to the first air blowing path of the first case and a diffuser panel included in a second diffuser provided to the second air blowing path of the second case are each formed in an arc-like shape to follow a rotation direction of the centrifugal fan.

* * * * *